May 12, 1936.  W. E. HOKE  2,040,741
ANTIFRICTION BEARING
Filed March 20, 1934  2 Sheets-Sheet 1
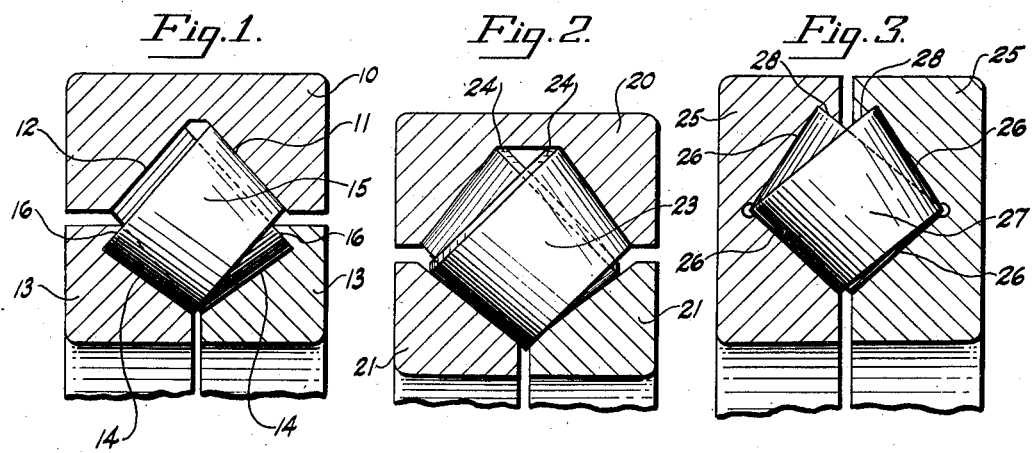
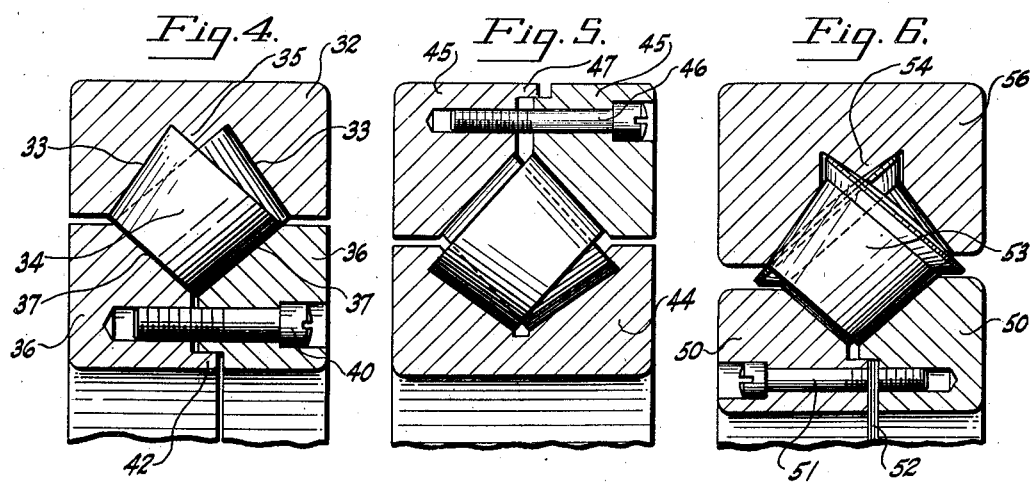
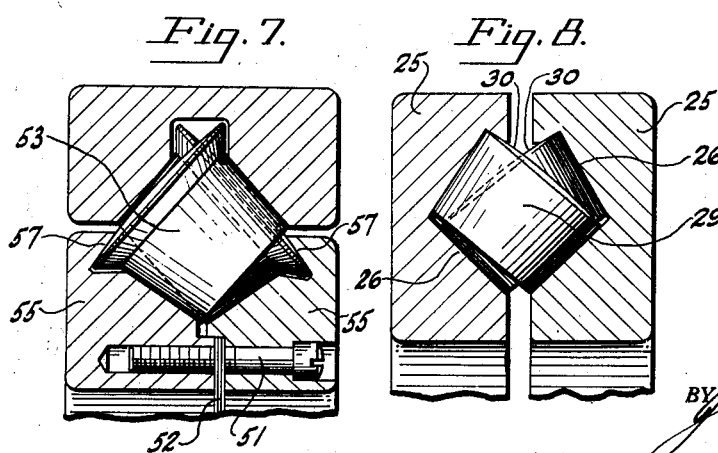
INVENTOR.
W. E. Hoke
BY Joseph K. Schofield
ATTORNEY

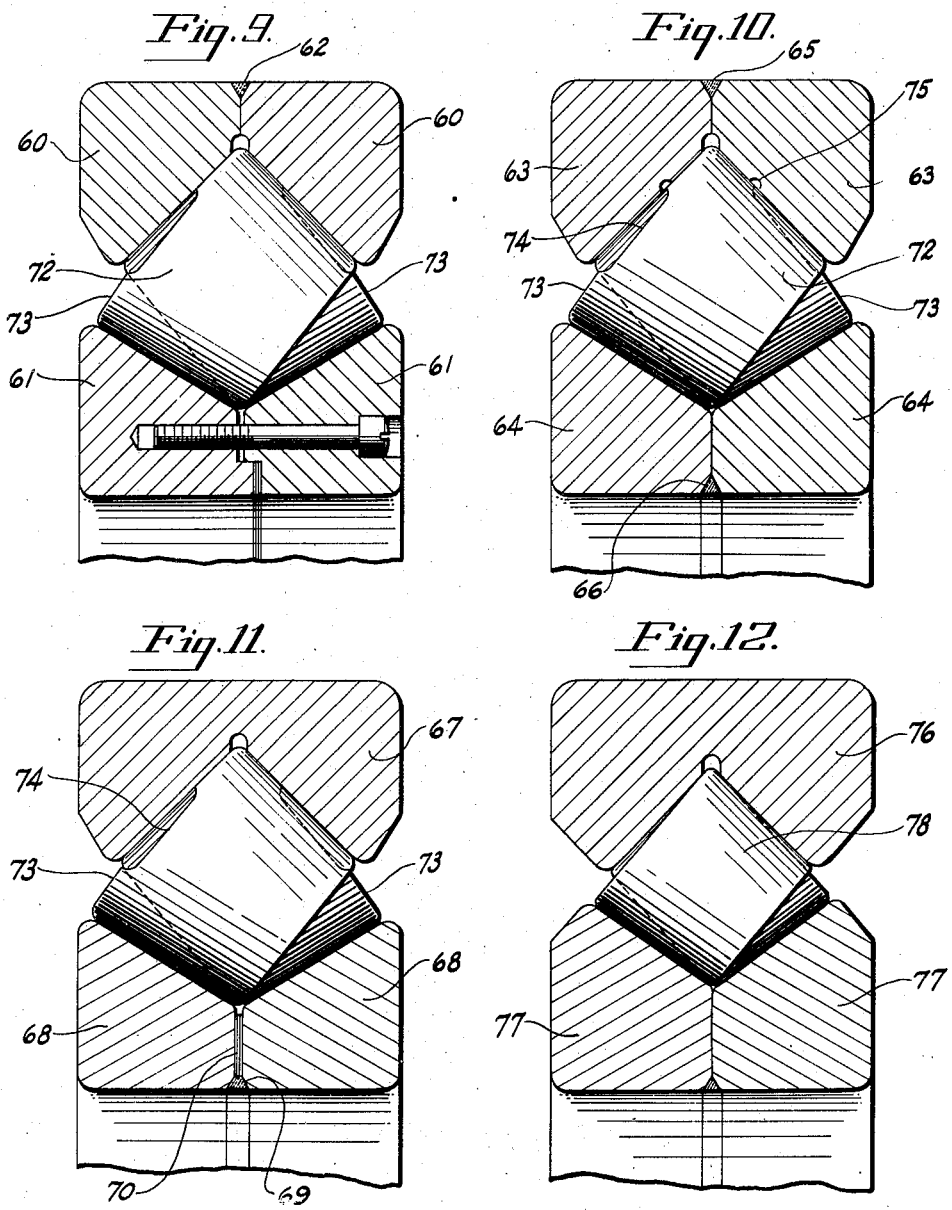

Patented May 12, 1936

2,040,741

UNITED STATES PATENT OFFICE 2,040,741

ANTIFRICTION BEARING

William E. Hoke, Baltimore, Md.

Application March 20, 1934, Serial No. 716,475

6 Claims. (Cl. 308—214)

This invention relates to anti-friction bearings and particularly to bearings having oppositely disposed annular series of conical anti-friction rolling members.

An object of primary importance of the present invention is to provide anti-friction bearings of improved construction and having opposed raceways formed in the cooperating race members, these raceways being so disposed in these members that series of tapered rollers may be placed in either of two positions in opposed relation to each other.

Another object of importance is that the tapered rollers forming the anti-friction members may be alternately disposed in overlapped positions in the opposite races and have a continuous bearing upon the race members throughout their length.

Further, it is an object of the invention to provide an improved three part anti-friction bearing, one of the race members being formed of two similar but opposed parts suitably coupled together permanently or detachably, and the other race member being formed by a single integral member.

And finally it is an object of the invention to provide the tapered anti-friction or rolling members with projections or heads, recesses being formed within one or both of the cooperating race members to accommodate these projections and to form a bearing surface for the head ends.

With the above and other objects in view my invention includes the features of construction and operation set forth in the following specification and illustrated in the accompanying drawings.

In the accompanying drawings annexed hereto and forming a part of this specification, I have shown my invention embodied in various forms of anti-friction bearings but it will be understood that the invention can be otherwise embodied and that the drawing is not to be construed as defining or limiting the scope of the invention, the claims appended to this specification being relied upon for that purpose. The bearings shown and described are selected as typical in construction and relative proportions, the angles of the rolling members and the oppositely disposed ways may be changed within limits to vary the characteristics desired.

In the drawings:

Fig. 1 is a fragmentary cross sectional view of one form of the invention having an integral outer race member for the opposed rows of rollers and two opposed inner race members.

Fig. 2 is a view similar to Fig. 1 showing a slightly modified form of race members.

Fig. 3 is a view similar to Fig. 1 but showing a form of the invention adapted for an axial thrust bearing.

Figs. 4, 5, 6, and 7 are fragmentary cross sectional views of radial thrust bearings illustrating different means for adjusting one of the race members, the opposite race member being integral.

Fig. 8 is a view similar to Fig. 3 but showing a slightly modified form of axial thrust bearing.

Figs. 9 and 10 are fragmentary cross sectional views of bearings having their outer race members formed of two opposed members permanently secured together, and Figs. 11 and 12 are views similar to Figs. 9 and 10 showing outer race members made of a single piece, the inner race member being formed of two opposed members permanently secured together.

In the above mentioned figures of the drawings I have shown several embodiments of the invention which are now deemed preferable, but it is to be understood that changes and modifications other than those shown in the drawings may be made within the scope of the appended claims without departing from the spirit of the invention.

Briefly, and in its preferred aspect, my invention may include cooperating members forming the outer and inner or opposed races of anti-friction bearings of the radial and end thrust types, one of the races preferably comprising two similar but opposed members and the other member forming the coacting race, in the outer and inner or opposed races are raceways, the complete bearing having raceways for oppositely disposed annular series of anti-friction rolling members, and there being provided adjustable clamping means for retaining the two part member in position relative to the other race member to properly retain the anti-friction members in position.

Referring more in detail to the figures of the drawings and first to Fig. 1 there is shown an outer ring or race member 10 having opposed raceways 11 and 12 substantially at right angles to each other and symmetrically disposed with respect to the axis of rotation of the bearing. It will be understood from this figure, that the race member 10 is of annular form, the raceways 11 and 12 being concentric with the axis and periphery of the member. The inner race member comprises two similar members 13 disposed in opposed relation to each other and each having a raceway 14. Each of the raceways 14 is complementary to one of the raceways 11 or 12 in the member 10. Disposed between these members 10 and 13 and bearing upon the raceways are anti-friction members 15 in the form of relatively large and short frustrums of cones their end surfaces being flat. Within the inner races 13 are overhanging flanges 16 against which the heads or larger ends of the anti-friction members 15 engage. It is these projections which take up the end thrust of the anti-friction members.

From the above it will be seen that two series of anti-friction members 15 may be provided, each series having their own bearing surfaces within the inner and outer race members. Also these series of anti-friction members may be made up by alternating the rollers 15. As seen in Fig. 1 the rollers 15 engage throughout their length upon the raceways and each roller 15 bears against a portion of the flange 16 to retain it in position. No cage or spacing member for the anti-friction members is made use of and these members are disposed closely adjacent each other.

Fig. 2 of the drawings shows a generally similar form of bearing to that shown in Fig. 1 in that the outer race member 20 is formed of a single integral member and the inner race of two members 21 opposed similar to each other. The disposition of the raceways is similar to those of Fig. 1 and also the position of the anti-friction members 23 is similar. In this embodiment however, the members 23 bear against an internal cylindrical surface of the outer race member 20 as an abutment. For that purpose the larger ends of the anti-friction rollers 23 have a short bevelled or conical portion 24.

Fig. 3 shows a form of the invention adapted primarily for thrust bearings, pressures being taken axially of the bearing, and comprises two similar opposed members 25 each having similar raceways 26 disposed angularly relatively to each other. The anti-friction members 27 are in every way similar to those shown in Fig. 1 and engage against overhanging projections 28 formed within outer radial portions of members 25 to retain the rollers 27 in position. The end surfaces of members 27 are flat over their entire surfaces similarly to those shown in Fig. 1.

Generally similar to the form of the invention shown in Fig. 3 is that shown in Fig. 8, also for a thrust bearing, in which the members 25, and their raceways 26 are or may be substantially similar. The anti-friction members 29 however, have their larger end surfaces 30 rounded to a portion of a sphere to form a better contact with their engaging surfaces. The form of the projections 28 against which the spherical ends 30 of the members 29 engage is therefore slightly different from the projections 28 but serves the same purpose and provides more surface in contact with the ends of the rollers 29 than the conical surfaces of flange 28 against the flat end surfaces of the rollers 27, shown in Fig. 3. Preferably the spherical end surfaces of the anti-friction members 29 may be formed to the same radius as their contacting surfaces which may also be formed spherical instead of conical.

In the above described embodiments of the invention no means are shown for retaining the cooperating members in proper relative position. It will be understood however that some means may be provided either well known or similar to those shown in subsequently illustrated embodiments. Certain installations may be such also that no special means may be necessary apart from members within which the bearings are mounted.

In Figs. 4, 5, and 6 are shown types of bearings having retaining means for the race members which when joined together form either the outer or inner race of a bearing. In Fig. 4 the outer race member 32 has bearing surfaces 33 for the opposed series of rollers 34. In this outer race member 32 a central abutment 35 is provided, the conical side surfaces of which contact with the larger end surfaces of the rollers 34. The inner race member is made up of two opposed members 36 each having a bearing surface 37 complementary to one of the bearing surfaces 33. To provide adjustment for the members 36 to properly retain the rollers 34 in contacting position relative to their bearing surfaces screws 40 may be provided but one being shown in the figure. Preferably these screws 40 extend between the members 36 parallelly to the axis of rotation of the bearing and are fully enclosed or housed within the bearing. Preferably also the members 36 have overlapping and closely fitting concentric cylindrical surfaces to retain the members 36 in concentric relation to the axis of rotation of the bearing. A flange 42 of annular form concentric with the axis enters a recess in the opposite member 36 so that the members 36 have closely fitting and overlapped portions.

In Fig. 5 a bearing having its inner race member 44 of one piece and in which are opposed bearing surfaces is shown. The outer race members 45 are disposed in opposed relation to each other and are retained adjustably in proper relative position by screws 46 similar to those shown in Fig. 4. In Fig. 5 the interfitting surfaces of the race members 45 are similar to those of Fig. 4 but are at the outer diameter of the bearing. A laterally extending flange 47 engages and closely fits the inner cylindrical surface of a recess formed in the opposite race member.

In Figs. 6 and 7 bearings are shown having their inner race members 50 and 55 respectively divided into opposed parts each having a single bearing surface. Screws 51 are provided in each bearing member to retain the inner race members in proper relation. Shims 52 in the form of thin annular plates may be inserted between the adjacent side surfaces of the race members 50 and 55 to hold these members positively in proper relative position.

Also in these Figures 6 and 7 the anti-friction members 53 are similar and are each provided with conical head portions adjacent their larger ends. In Fig. 6 the spherical end surfaces of the heads engage against the sides of a central projection 54 in the outer race member 56. The surfaces of the outer race adjacent the conical portion of the heads of members 53 are sufficiently cut away to be out of contact so that contact is assured between the spherical end surface of the members 53 and the internal surfaces of the sides of the projection 54. In Fig. 7 the spherical end surfaces of the rollers 53 bear against overhanging projections 57 within the inner race members 55. In this form the recess forming the bearing surface for the enlarged heads is cut away sufficiently and the outer race has its central portion recessed so that the abutments 57 will be the only surfaces contacting with any portion of the spherical head of the members 53. By the provision of the head on the anti-friction rollers 53 increased surface is provided to resist outward movement of the members 53 from the bearings.

Figs. 9, 10, 11, and 12 show additional embodiments of the invention. These forms employ the races as abutment surfaces and for this purpose they contact with the end surfaces of the anti-friction. Each anti-friction member has its surface of revolution engaging one raceway and its end surface engaging the opposed raceway.

Fig. 9 indicates a built up construction in which the race members 60 and 61 forming respectively the outer and inner race of the bearing are of two cooperating and opposed parts. The two parts 60 forming the outer races are shown as being welded together along a central plane 62. These parts may have their raceways completely ground and finished prior to being welded together. The members 61 forming the inner raceways may be fastened together as in the form of the invention shown in Figs. 4 and 6.

In Fig. 10 a permanently secured together construction is shown. Both the parts 63 forming the outer races and the parts 64 forming the inner races are shown as being welded together along the central transverse plane of the bearing. These welds are shown at 65 and 66 respectively and are preferably electric-arc weldings, one of which may be made after complete assembly of the bearing.

In Fig. 11 the outer race member 67 for the opposed series of anti-friction members 72 is integral, similar to that shown in Fig. 1. The inner race member is made up of two opposed parts 68 similar to the parts 64 and welded together as indicated at 69. In this embodiment of the invention the parts 68 are held in spaced apart relation by shims 70 prior to being welded together.

In each of the above referred to Figures 9, 10, and 11 the anti-friction members 72 are entirely similar. The large ends 73 of these members 72 are preferable and are shown slightly conical about their peripheries, their central portions being cut away or recessed as shown at 74. By thus forming the ends of these members 72 surface contact may be provided between conical end surfaces 73 and the surface of the raceway in the outer ring members 60, 63, and 67. Also if desired an annular groove 75 shown in Fig. 10 may be provided in the races of the outer members 63 substantially in the position shown and adjacent the cutaway part of the surface 73. The outer raceway on that side of the groove which is adjacent the apex of the two raceways serves as an abutment and bearing surface for one series of antifriction members and as a portion of the raceway for the opposite series of anti-friction members.

In Fig. 12 race members are shown, the outer members 76 of which is similar to that shown in Fig. 11 and the inner member 77 of which is similar to the inner race member shown in Fig. 10. In this embodiment of the invention the anti-friction members 78 have flat ends, the portions adjacent the periphery of which contact with the raceway opposite that engaged by the surfaces of revolution of the members 78. The contact between the flat end surfaces of the members 78 and the conical surfaces of the outer race theoretically will be two spaced points on the periphery of the end surface, slight wear however of the end surface and of the raceway will result in an area coming into contact. This contact will vary widely according to the angular disposition of the raceways and the apex angle of the anti-friction members. Preferably and as shown the angles of the raceways for the opposed series of anti-friction members and the included angle between opposite elements of the anti-friction members are chosen so that the points of contact are close together and at the periphery of the anti-friction members.

In assembling the parts of these bearings the anti-friction members are alternately disposed to engage their bearing surfaces, no cage or retainer for the series of anti-friction members being necessary. The anti-friction members are relatively short their axial length being approximately equal to their average diameter. Variations however of this ratio are possible, the purpose of the general proportions being to permit the members to engage their bearing surfaces continuously along their elements. By the provision of one race member having two raceways and the other complementary race members each having one raceway accurate adjustment and equalization between the pressures of the series of anti-friction members is possible. When assembled the bearings will resist radial and axial or thrust forces. The types shown in Figs. 3 and 8 will resist axial forces in one direction and radial forces similarly to the other forms shown in Figs. 1, 2, 4, 5, 6, and 7. The forms shown in Figs. 3 and 8 are primarily designed for maximum thrust or axial force bearings, the opposed series of rollers enabling a smooth bearing to be effected and maximum loads in one direction to be carried by the bearing.

What I claim is:

1. An anti-friction bearing comprising in combination, a race member, a cooperating race member, each of said race members having oppositely disposed conical raceways therein, and tapered anti-friction rollers disposed closely adjacent each other between said raceways alternately in opposed overlapped relationship to each other, said rollers bearing upon each of said raceways continuously along the entire length of their elements the large end only of each roller bearing against a raceway opposed to the raceway upon which the roller rolls.

2. An anti-friction bearing comprising in combination, cooperating race members each having raceways therein for opposed series of tapered rollers, said rollers being disposed within said raceways alternately in overlapped positions, said raceways engaging said rollers throughout the length of their elements, and flanges formed on one of said races to retain said rollers in position.

3. An anti-friction bearing comprising in combination, outer and inner races each having raceways therein for opposed overlapped series of taper rollers, said raceways engaging said rollers throughout the length of their elements, and lateral projections on said rollers, one of said races having recesses formed therein accommodating said projections and forming bearing surfaces therefor.

4. An anti-friction bearing comprising in combination, a race member, a cooperating race member, each of said race members having oppositely disposed conical raceways therein, and tapered anti-friction rollers disposed between said raceways alternately in opposed overlapped relationship to each other, the surface of revolution of each roller engaging a raceway in each of said race members continuously along the entire length of their elements, and the end surfaces at one end only of said rollers adjacent their peripheries abutting against opposed raceways in one of said race members.

5. An anti-friction bearing comprising in combination, a race member, a cooperating race member, each of said race members having oppositely disposed raceways therein, tapered anti-friction rollers disposed between said raceways alternately in opposed overlapped relationship to each other, the surfaces of revolution of each roller engaging a raceway in each of said race members continuously along their elements, and conical ends formed on said rollers, one of the ends of each roller abutting against an opposed raceway in one of said race members adjacent its intersection with the opposed raceway.

6. An anti-friction bearing comprising in combination, a race member, a cooperating race member, each of said race members comprising similar opposed members, and each of said race members having oppositely disposed raceways therein, tapered anti-friction rollers disposed between said raceways closely adjacent each other and disposed alternately in opposed overlapped relationship and having one end only abutting against an opposite raceway, said rollers engaging said raceways throughout the length of their elements, and means to retain said opposed members fixedly in proper relation to each other.

WILLIAM E. HOKE.